US006163322A

United States Patent [19]
LaChapelle

[11] Patent Number: 6,163,322
[45] Date of Patent: Dec. 19, 2000

[54] METHOD AND APPARATUS FOR PROVIDING REAL-TIME ANIMATION UTILIZING A DATABASE OF POSTURES

[75] Inventor: Pierre LaChapelle, Montreal, Canada

[73] Assignee: Taarna Studios Inc., Montreal, Canada

[21] Appl. No.: 09/032,169

[22] Filed: Feb. 27, 1998

[30] Foreign Application Priority Data

Jan. 19, 1998 [CA] Canada ................................. 2227361

[51] Int. Cl.[7] .................................................. G06T 15/70
[52] U.S. Cl. ........................................ 345/473; 345/474
[58] Field of Search .................................. 345/477, 474, 345/473, 475, 418, 419

[56] References Cited

U.S. PATENT DOCUMENTS

| 5,963,217 | 10/1999 | Grayson et al. | 345/473 |
| 6,008,818 | 12/1999 | Amakawa et al. | 345/473 |
| 6,061,071 | 5/2000 | Kawai et al. | 345/473 |
| 6,061,072 | 5/2000 | Rouet | 345/473 |

OTHER PUBLICATIONS

A. Bruderlin et al., "Motion Signal Processing," SIGGRAPH 95 Conference Proceedings, Annual Conference Series, Aug. 1995, pp. 97–104.

M. J. Fusco et al., "Vactor™ Animation Creation systems," SIGGRAPH 93 Tutorial Notes 01: Character Motion Systems, Aug. 1993, pp. 9–22.

K. Kardan, "Tools For The Animation of Facial Expressions Using Computer Graphics," 134th SMPTE Technical Conference, Nov. 1992, pp. 1–16.

Y. Lee et al., "Realistic Modeling for Facial Animation," SIGGRAPH 95 Conference Proceedings, Annual Conference Series, Aug. 1995, pp. 55–61.

M. Oka et al., "Real–Time Manipulation of Texture–Mapped Surfaces," Computer Graphics (SIGGRAPH '87 Proceedings), vol. 21, Jul. 1987, pp. 181–188.

F. I. Parke, "Parameterized Models for Facial Animation," IEEE Computer Graphics and Applications, vol. 2, Nov. 1982, pp. 61–68.

E. C. Patterson et al., "Facial Animation by Spatial Mapping," Computer Animation '91, pp. 31–44.

C. Pelachaud et al., Final Report to NSF of the Standards for Facial Animation Workshop, Tech. Report, Dept. of Computer and Information Science, University of Pennsylvania, 1994.

F. Pighin et al., "Realistic Facial Animation Using Image–Based 3D Morphing," Tech. Report UW–CSE–97–01–03, Dept. of Computer Science, University of Washington, May 1997.

K. Waters, "A Muscle Model for Animating Three–Dimension Facial Expression," Computer Graphics (SIGGRAPH '87 Proceedings), vol. 21, Jul. 1987, pp. 17–24.

L. Williams, "Performance–Driven Facial Animation," Computer Graphics (SIGGRAPH '90 Proceedings), vol. 24, Aug. 1990, pp. 235–242.

*Primary Examiner*—Cliff N. Vo
*Attorney, Agent, or Firm*—Ratner & Prestia

[57] ABSTRACT

A method and apparatus for animating a synthetic body part. The 3D-animation system and method use a database of basic postures. In a first step, for each frame, a linear combination of the basic postures from a database of basic postures is obtained by minimizing the Euclidean distance between the displacement of critical points. The displacement information is supplied externally, and typically can be obtained by observing the displacement of physical markers placed on a moving physical body part in the real world. For instance, the synthetic body part may be an expression of a human face and the displacement data are obtained by observing physical markers placed on the face of an actor. The linear combination of the postures in the database of postures is then used to construct the desired posture. Postures are constructed for each time frame and are then displayed consecutively to provide animation. A computer readable storage medium containing a program element to direct a processor of a computer to implement the animation process is also provided.

64 Claims, 8 Drawing Sheets

METHOD AND APPARATUS FOR PROVIDING REAL-TIME ANIMATION UTILIZING A DATABASE OF POSTURES

FIELD OF THE INVENTION

The invention relates to a method and an apparatus for animating synthetic 2 dimensional (2D) and 3 dimensional (3D) computer graphic objects. It is particularly applicable to a method and an apparatus for manipulating a 2D or 3D synthetic body part such as to be able to animate it through a wide range of postures realistically or artistically. The invention also provides a computer readable storage medium containing a program element to direct a processor of a computer to implement the animation process.

BACKGROUND OF THE INVENTION

Body language is used in many situations to communicate information to the outside world. In particular, human facial expressions can convey a large amount of information and are a very common communication channel between humans. This omnipresence of faces in our world has a parallel in many applications of computer graphics where faces are desired. Body language and facial animation have been the subject of research in many areas such as medicine, anatomy, psychology, computer vision, computer graphics and many others. As a reference, the interested reader may wish to consult F. Parke and K. Waters, *Computer Facial Animation*, A K Peters, 1996 whose content is hereby incorporated by reference.

Typical animation systems can be divided into two categories namely interpolation system and parametrization systems. Interpolation involves using key-frames in 2D or 3D located at different moments in the animated sequence. Intermediate frames are simply interpolated between two successive key frames. The interpolation method has several disadvantages. First, interpolation requires the modelling of a complete database of basic frames, which can be time consuming and may require a large amount of computer memory space. Second, the type of interpolation limits the intermediate frames generated and if two frames do not blend nicely, one or more frames must be added to the sequence. Lastly, for each new model, a complete database must be built which is time consuming and costly.

Parameterization reduces some of the problems encountered using interpolation. A parameter is defined as an arbitrary value that characterizes a member of a system and may also describe functions of that member. In simple terms, parameterization involves expressing the characteristics of a system in terms of parameters. As a simple example, a parameter may be used to describe the position of the eyes on a face using coordinates in 3D space such as cartesian coordinates. An example of parameterization in facial animation is described in F. I. Parke, "Parameterized models for facial animation," *IEEE Computer Graphics and Applications*, Vol. 2, Nov. 1982, pp. 61–68 whose content is hereby incorporated by reference. The parameterization technique presented is applied to both to the facial model, herein referred to as conformal control, to build a face out of all parameterized facial features, and to the animation process, herein referred to as expression control, to animate a model independently of any specific face. Usually, this parameterization technique requires a single basic model of the face, eliminating the need for a complete database of models and hence requiring less storage space. Systems derived from the concepts of parameterization and interpolation represent a large portion of current developments in facial animation systems. For example in K. Waters, "A muscle model for animating three-dimensional facial express," *Computer Graphics* (SIGGRAPH '87 Proceedings), volume 21, July 1987, pp. 17–24, Y. Lee et al., "Realistic face modeling for animation." SIGGRAPH 95 Conference Proceedings, Annual Conference Series, Aug. 1995, pp. 55–62 and in Y. Wu et al., "A dynamic wrinkle model in facial animation and skin ageing," *Journal of Visualization and Computer Animation*, Vol. 6, No. 4, Oct. 1995, pp. 195–206, the parameterization used distributes two types of muscles and their attachment on a synthetic face in order to induce complex non-linear motion. The contents of the above documents are hereby incorporated by reference.

One problem with the parameterization technique is that the key aspect in conformal and expression controls relies upon the parameterization model itself. Developing a parameterization flexible enough to create any possible face, and allowing it to take any desired expression with simple and intuitive controls, is a very complex task. Too few parameters offer only a limited spectrum of expressions, while too many parameters will overwhelm an animator creating a specific expression on a specific face. The right balance generally depends upon the application, but it seems thus far that no unique parameterization has proven to be sufficient for all applications. The problem is further compounded when faces must include all kinds of human, animal and cartoon faces.

Another problem with parameterization systems is the complicated control of the parameters of the synthetic characters by a user in order to animate the synthetic character. A powerful solution to this problem consists in tracing features via markers, snakes, or stereo-matching on a performance actor and mapping this motion onto the synthetic character. For more information about the subject, the reader is invited to consult E. C. Patterson et al., "Facial animation by spatial mapping," *Computer Animation '91*, 1991, pp. 31–44; F. Pighin et al., *Realistic facial animation using image-based 3D morphing*, Tech. Report UW-CSE-97-01-03, Dept. of Computer Science, University of Washington, May 1997 and L. Williams, "Performance driven facial animation," *Computer Graphics* (SIGGRAPH '90 Proceedings), volume 24, Aug. 1990, pp. 235–242 whose contents are hereby incorporated by reference. Controls for parameters of the type described above allow a simple control for the animation of the synthetic object. However, this technique tends to deform the 2D or 3D synthetic model with little consideration for the properties of the synthetic model itself such as different shapes and motions between the performer and the character. The resulting animation is often of poor quality and requires considerable modifications from the artists making use of the animation tool.

Thus, there exists a need in the industry to refine the process of animating body parts such as to obtain more natural animation sequences taking into account the properties of the synthetic model particularly applicable to a wide variety of body parts and more specifically taking into account the properties of the synthetic faces.

OBJECTS AND STATEMENT OF THE INVENTION

A principal object of the invention is to provide a computer readable storage medium containing a program element that instructs a computer to generate a graphical representation of a synthetic body part in a desired posture.

another object of the invention is to provide a system for generating data providing a graphical representation of a synthetic body part in a desired posture.

Another object of the invention is to provide a method for generating data providing a graphical representation of a synthetic body part in a desired posture.

Another object of the invention is to provide a computer readable storage medium containing an animation program element for directing a computer to generate a succession of data sets providing respective graphical representations of a synthetic body part in different postures.

Another object of the invention is to provide an animation system and method capable of generating a succession of data sets providing respective graphical representations of a synthetic body part in different postures.

As embodied and broadly described herein the invention provides a computer readable storage medium containing a program element for directing a computer to generate data providing a graphical representation of a synthetic body part in a desired posture, said program element implementing functional blocks comprising:

means for receiving source data that is representative of the synthetic body part in the desired posture;
means for receiving basic posture data from a database containing data elements, the data element being representative of the body part in different postures;
processing means for processing said source data and said basic posture data to generate the data providing a graphical representation of the synthetic body part in the desired posture.

For the purpose of this specification the expression "synthetic body part" refers to a graphic representation of a body part. Here, the expression "body part" is used in a broad sense to designate any part of a human or an animal body. For example, a facial posture or expression denotes the position of the parts of a face during a smile, a frown or any other position that a face may take. Similarly, the posture of a hand could be a closed fist, a pointing finger, an open hand or any other posture of a hand.

For the purpose of this specification, the expression "synthetic coordinate space" is used to designate the coordinate space that defines the position of points characterizing the synthetic body part.

For the purpose of this specification, the expressions "neutral posture" and "neutral expression" are used to designate the rest position of a body part.

For the purpose of this specification the expression "physical marker" is used to designate a location in the real physical world. In a specific example, each physical marker can be mapped onto points in the synthetic coordinate space by using a mapping function.

For the purpose of this specification the expression "performance actor" is used to designate the person or animal on which the physical markers being traced are placed.

For the purpose of this specification, the expression "graphical representation", particularly where used. The context of a synthetic body part, refers to data providing a definition of or characterizing the synthetic body part in a way that the data can be used to provide or construct an image of the synthetic body part. For instance, the data may be the image itself or a mathematical abstraction of the image that needs to be processed to obtain the image.

For the purpose of this specification, the expressions "model" and "facial model" are used to designate a mathematical abstraction that captures to some degree the form and function of a body part, whether human animal or otherwise, in a way that makes the model useful for specific applications.

In a preferred embodiment, the animation system is used in a facial animation system allowing a user to generate a facial animation sequence. The process can be divided into five distinct stages namely actor motion; computation of displacement parameters; computation of weights; generation of animation model and display. Preferably at each time frame t, a synthetic posture or expression of the face is constructed by obtaining a linear combination of data elements representative of basic facial expressions located in a database. This database is composed of basic expressions and comprises a neutral express $E_0$ and a set of n basic expressions. Preferably the n basic expressions are based on this neutral expression $E_0$.

The set of n basic facial expressions and the neutral expression $E_0$ can be considered as forming the axes of an expression coordinate frame originating from the neutral expression $E_0$. More specifically, a 3D facial model made of M three-dimensional points can be interpreted as a point in 3M dimension. A facial expression $E_f$ can be represented in a subspace defined by $E_0$ and the n basic expressions as a combination of the n basic facial expressions, preferably as a linear combination of them.

Some data are provided to generate each synthetic posture of expression in the animation sequence. The source data characterize each synthetic expression to be construed and are used by the system as a model to generate the synthetic expression by combining together basic postures or expressions from the database.

In a typical interaction, sets of markers on a performer's face are used to track the movements of the face of the performer. Preferably, these markers are located at strategic positions and are generally chosen on and/or around eyebrows, lower jaw, chin, cheeks and cheek-bones to capture the global movements of the face. During the recording sequence, the performance actor moves his face in a desired fashion in order to supply motion information to the animation system. The specific motion is left to the discretion of the performance actor. At each frame, the movements of the physical markers are collected. The animation apparatus creates the desired expression $E_f$ corresponding to the motion of the markers by using the set of n basic facial expressions and the neutral expression $E_0$ stored in the database of basic facial expressions. In this particular example, the data collected are displacement data indicative of a desired shift of position of the synthetic face through different expressions. Each frame of the displacement data forms the source data necessary to build the synthetic face corresponding to the facial expression characterized by the source data.

Following the motion of the action, the displacement of the physical markers is mapped onto a displacement in the synthetic coordinate space. This is done by computing the displacement vector [e] from a reference. The preferred embodiment uses the neutral expression $E_0$ as the reference. A mapping template is used to translate the physical displacement of the markers into displacements in the synthetic coordinate space. This mapping takes into account the geometric scaling discrepancies between the synthetic character model and the actor's face.

The following step in the generation of the animation sequence is to compute the weights $\lambda$ that are to be assigned to each basic expression in the database to create the facial expression $E_f$. In the preferred embodiment, the database of basic expressions is represented by a matrix of which each column is composed with the displacements $\xi_i$ of each of the M points in the model from the neutral model $E_c$. Alternatively, m critical points can be chosen (m≦M) such as to reduce the computation time such that each basic facial expression comprises m critical points that form a polygonal mesh or mask. Thus the computation is performed for the m critical points and the results are interpolated over the M points of the model before it is displayed. The preferred embodiment uses m≈100 critical points such that a point in the 3m dimensions represents each basic expression.

A vector of weights $[\lambda]$ of size n, where n is the number of basic expressions in the database, is used to provide a linear combination of the displacements $\xi_i$ in the database to achieve the desired displacement $[e]$. In mathematical terms, this amounts to finding a set of weights $[\lambda]$ that satisfy $[\xi][\lambda]=[e]$. Since the displacement $[e]$ to achieve the desired expression $E_f$ might not be exactly representable in the space defined by the n basic expressions and the neutral expression $E_o$, $[e]$ is approximated by $[\hat{e}]$ according to the Euclidean norm $\|[\xi][\lambda]-[e]\|$ and a least square algorithm is used to solve for $[\lambda]$. It is preferable that the least square algorithm used allows constraining the values of $[\lambda]$ to lie within a certain range to avoid distorting the synthetic face in an undesireable way. Therefore, the solution for $[\lambda]$ sought is one of a least square problem subject to an inequality:

$$[\xi][\lambda]=[e] \text{ and } [G][\lambda]\leq[h]$$

where the matrices $[G]$ and $[h]$ jointly define the allowable range of values for the elements of $[\lambda]$. The preferred embodiment of this invention uses a robust least square solver with inequalities (LSI). The solution to the LSI is obtained by first transforming the problem into a Least Distance Projection (LDP) problem following which the LDP is solved using the Non-Negative Least Squares (NNLS) algorithm. Following this, the solution to the LDP is then transformed into an LSI solution and the result is returned as the weights $[\lambda]$. Other algorithms for solving least square problems with inequalities can be used here without detracting from the spirit of the invention. Algorithms to solve least square problems are well-known in the art to which this invention pertains and the user is invited to consult C. L. Lawsin and R. J. Hanson, Solving Least Square Problems, Prentice Hall, 1960 and W. H. Press et al., Numerical Recipes in C: The Art of Scientific Computing, $2^{nd}$ ed. Cambridge Press, 1992 whose contents are hereby incorporated by reference.

The complete expression $E_f$ is then constructed by computing the linear combination of the expressions in the database using the weights obtained. In the case where the weight were computed for the m critical points of the model only instead of for all the M points, the expression $E_f$ is then completed with all its M points by interpolating the result over the M points of the model. Interpolation over a polygonal mesh or patch with control points is well known in the art to which this invention pertains. Finally, the synthetic model with the generated expression $E_f$ is generated for being immediately displayed or stored for subsequent use. Expressions $E_f$ generated for consecutive time frames t are displayed to yield an animated sequence. As a variant, expressions $E_f$ can be generated every K frames, the intermediate expressions being generated by interpolating the results. The process of interpolation is well-known in the art to which this invention pertains.

As embodied and broadly described herein the invention provides a computer readable storage medium, comprising:
a program element for directing a computer to generate data providing a graphical representation of a synthetic body part in a desired posture;
a database containing data elements, the data elements being representative of the body part in different postures;
said program element being responsive to an input of source data that is representative of the synthetic body part in the desired posture to generate the data providing a graphical representation of the synthetic body part in the desired posture.

As embodied and broadly described herein the invention provides a system for generating data providing a graphical representation synthetic body part in a desired posture, said system comprising:
an input for receiving source data that are representative of the synthetic body part in the desired posture;
a memory containing a database containing data elements, the data elements being representative of the body part in different postures;
processing means in operative relationship with said input and with said memory for processing said source data and said database to generate the data providing a graphical representation of the synthetic body part in the desired posture;
an output for outputting the data providing a graphical representation of the synthetic body part.

As embodied and broadly described herein the invention provides a method for generating data providing a graphical representation of a synthetic body part in a desired posture, said method comprising the steps of:
providing source data that are representative of the synthetic body part in the desired posture;
providing a database containing data elements, the data elements being representative of the body part in different postures;
processing the source data and data elements from said database to generate the data providing a graphical representation of the synthetic body part in the desired posture.

As embodied and broadly described herein the invention provides a computer readable storage medium containing an animation program element for directing a computer to generate a succession of data sets providing respective graphical representations of a synthetic body part in different postures, said program element implementing functional blocks comprising:
means for receiving displacement data indicative of a desired shift of position of the synthetic body part through the different postures;
means for receiving basic posture data from a database containing data elements, the data elements characterizing the body part in different postures;
processing means for processing said displacement data and said basic posture data to generate the succession of data sets.

As embodied and broadly described herein the invention provides an animation system for generating a succession of data sets providing respective graphical representations of a synthetic body part in different postures, said system comprising:
an input for receiving displacement data indicative of a desired shift of position of the synthetic body part through the different postures;
a memory containing a database containing data elements, the data elements characterizing the body part in different postures;
processing means in operative relationship with said input and with said memory for processing said displacement data and said data elements to generate the succession of data sets;
an output for outputting the data sets.

As embodied and broadly described herein the invention provides a method for animating a synthetic body part by generating a succession of data sets providing respective graphical representations of the synthetic body part in different postures, said method comprising the steps of:

providing source data indicative of a desired shift of position of the synthetic body part through the different postures;

providing a database containing data elements, the data elements being representative of the body part in different postures;

processing means for processing said displacement data and said database to generate the succession of data sets.

As embodied and broadly described herein the invention provides a computer readable storage medium, comprising:

an animation program element for directing a computer to generate a succession of data sets providing respective graphical representations of a synthetic body part in different postures;

a database containing data elements, the data elements characterizing the body part in different postures;

said program element being responsive to an input of displacement data indicative of a desired shift of position of the synthetic body part through the different postures for processing said database to generate the succession of data sets.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention for which reference should be made to the appending claims.

DESCRIPTION OF A PREFERRED EMBODIMENT

Figure 1:
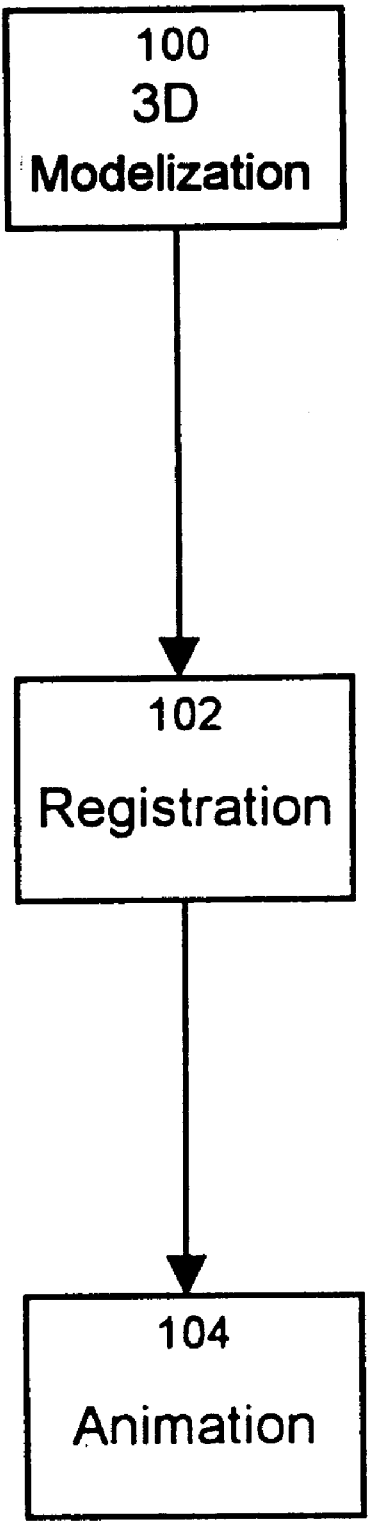
FIG. 1 shows the stages in the generation of an animation sequence in accordance with the present invention.

In the most preferred embodiment of this invention, the apparatus to animate a synthetic body part is used in an animation system allowing the creation of a realistic or artistic animation sequence in real time. For the sake of illustration, the description given here relates to the animation of a synthetic face. However, the methods presented here can be applied to other human or animal body parts such as hands, feet and others without detracting from the spirit of the invention, by replacing the set of basic facial expressions described below with a set of postures or parts corresponding to the body part being animated. In addition, for the purposes of clarity and completeness, the animation system described below is one that operates on a 3D model. Note however that the same procedure may be applied to a 2D model without detracting from the spirit of the invention by replacing the 3D models and algorithms with their equivalent 2D counterparts.

For technique that can be used to generate a synthetic facial expression $E_f$ corresponding to the displacement of the physical markers on a performer's face, the displacement of each marker (as scaled by their projection) is added to the position of the critical point in the neutral expression $E_0$. Mathematically, this can be expressed as:

$$E_f = E_0 + e \qquad \text{Equation 1}$$

where e is a vector describing the displacement of each marker. However, the results obtained by this technique are not optimal since the computation does not take into account the properties of the model itself. In other words, the resulting synthetic expression suffers from undue distortions.

In contrast, the present invention uses in a specific embodiment a database of basic facial expressions along with a set of displacement vectors e to provide a wide spectrum of synthetic expressions as high quality animation. The displacement vector e is approximated by a vector ê composed of weighted displacement values obtained from the database of basic expressions. The approximated vector ê is then added to the neutral expression $E_0$ to yield the desired expression $E_f$.

In the preferred embodiment, the animation apparatus creates the desired expression $E_f$ corresponding to the motion of the markers by using a set of basic facial expressions stored in a database of basic facial expressions. The database comprises the neutral facial model $E_0$ and n basic facial expressions derived from that model. Preferably, the neutral expression $E_0$ is considered as the origin of a coordinate system such that any facial expression $E_i$ can be expressed as a displacement from the neutral position. Mathematically, this displacement vector can be expressed as:

$$\xi_i = E_i - E_0 \qquad \text{Equation 2}$$

The set of n basic facial expressions in the database of facial expressions can be considered as forming the axes of an expression coordinate frame originating from the neutral expression $E_0$. More specifically, a 3D facial model made of M three-dimensional points can be considered as a point in 3M dimension. Alternatively, we can choose m points (m≦M), herein referred to as critical points, and perform the calculations on this reduced set such as to reduce the computation time. The preferred embodiment uses m≈100 critical points such that each basic expression is composed of m points and that the desired facial model is obtained by interpolating the result over the M points of the complete model. The set of m critical points is typically linked into a polygonal mesh called a mask. Interpolation over a polygonal mesh is well known in the art to which this invention pertains. The set of n basic facial expressions then spawns a subspace E of $R^{3m}$ by choosing weights for each expression. Thus E defines the set of all facial expressions exactly representable in the subspace $R^{3m}$ where m is the number of critical points. Mathematically, any facial expression $E_f$ in the subspace R ($E_0$; $\xi_1, \ldots, \xi_n$) can be represented as a combination of the n basic facial expressions, preferably as a linear combination as shown in the following equations:

$$\hat{e} = \sum_{i=1}^{n} \lambda_i \xi_i \qquad \text{Equations 3}$$

$$E_f = E_0 + \hat{e}$$

Figure 5:
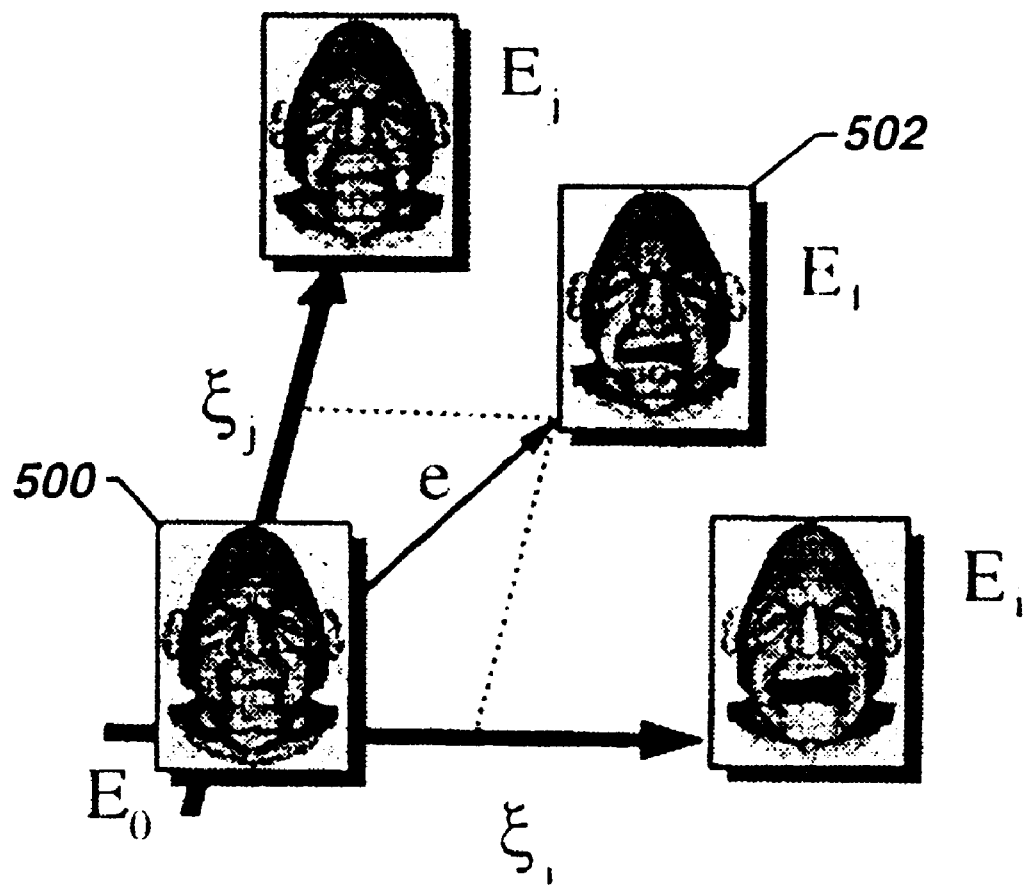
FIG. 5 illustrates a combination of basic postures and weights used to generate a desired synthetic posture.

In the above equations, $\lambda_i$ is a vector of size n whose entries are indicative of the weights assigned to each of the n basic expressions and ê is the displacement vector of the size 3m and describes the displacements of the points from the neutral expression $E_0$. An example of such a coordinate frame is shown in FIG. 5. In this example, the neutral expression 500 leaves the left side of the mouth open as a permanent deformation and, by assigning values to all $\lambda_i$, a facial expression $E_f$ 502 is constructed.

Figure 2:
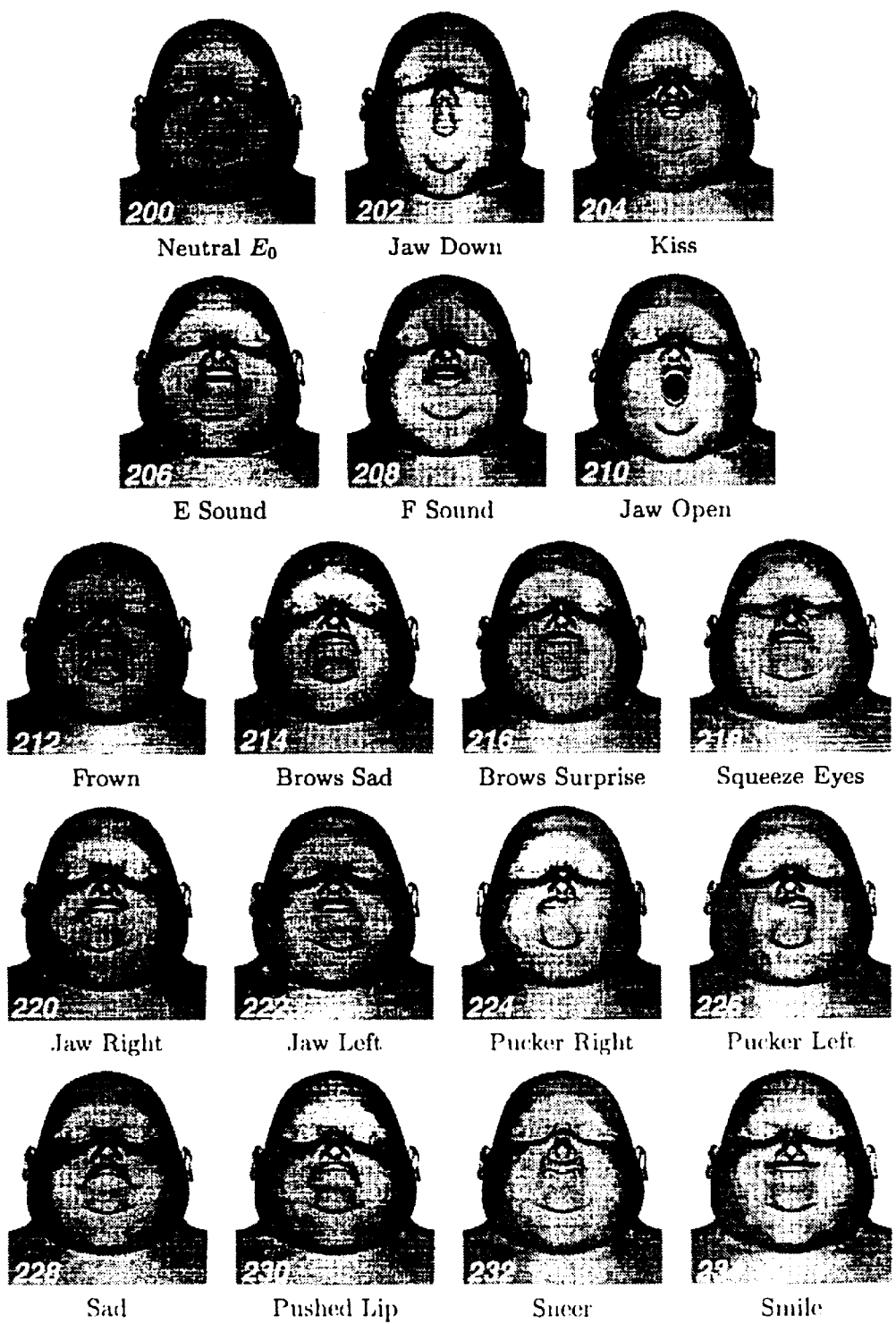
FIG. 2 shows a typical database of postures in accordance with the invention.

The generation of an animation sequence in accordance with the spirit of the invention can be divided into three distinct phases, a shown in FIG. 1, namely modelization 100, registration 102 and animation 104. The first step 100 consists of selecting a neutral facial expression $E_0$ and, based on this neutral expression, creating a set of n basic expressions to form a database, herein referred to as a database of basic expressions. The user may manipulate the features in each of the n basic expressions any way he pleases provided all expressions keep the same topology. Typically, each facial expression is represented by a set of 2D or 3D points and there exists a one-to-one correspondence between points in a basic facial expression and points in the neutral expression $E_0$. Therefore, in the preferred embodiment, the number of points and their configuration remain fixed for each facial model within a single database. FIG. 2 shows a typical database of expressions 200, 202, 204, 206, 208, 210, 212, 214, 216, 218, 220, 222, 224, 226, 228, 230, 232, 232, and 234, with its neutral facial expression in the top left corner identified as $E_0$ 200. A described above, each facial model is represented by a set of M 3D points where M is the number of points in the model. The modelization stage 100 only needs to be performed once for each new face to animate. The faces in the database of facial expressions can be of any configuration such as animal, cartoon or human without detracting from the spirit of the invention.

Figure 4:
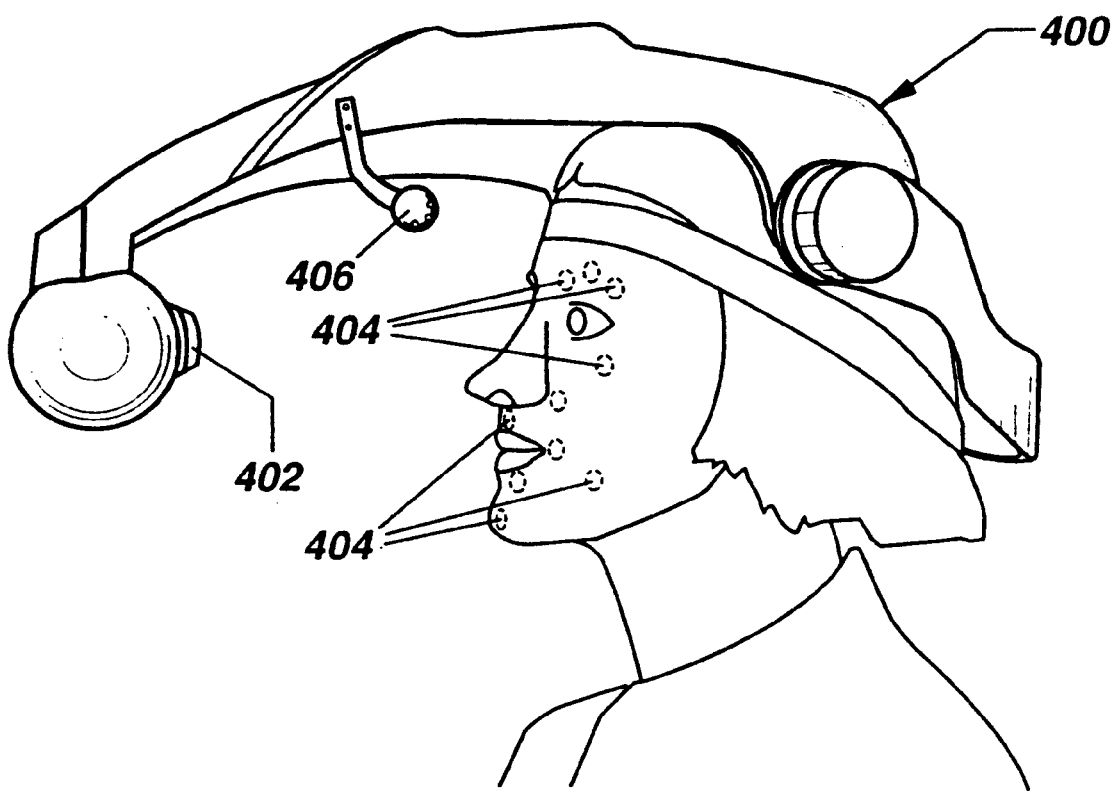
FIG. 4 shows a live tracing system that follows the displacements of physical markers on a performer's face.

Following the modelization stage 100, the registration stage 102 maps markers located on a live performer, preferably with the performer's face in his natural position, onto points on the neutral facial expression $E_0$ of the model in the synthetic coordinate space. This projection, herein referred to as the mapping template, takes into account the geometric scaling discrepancies between the synthetic character model and the actor's face in the case where the markers are placed on an actor's face. This scaled projection forms the link between the synthetic character and the performer and allows transferring proper marker displacements to the system. The theory of projection is well known in the art of computer graphics. In a typical interaction, sets of markers on a performer's face are used to track the movements of the face of the performer. Preferably, these markers are located at strategic positions and are generally chosen on and/or around eyebrows, lower jaw, chin, cheeks and cheek-bones to capture the global movements of the face. In addition to this global tracking markers, additional points around the eyelids and the mouth can be used to capture the movements of more localized features. An example of a live tracking system is shown in FIG. 4 and generally comprises a helmet 400, a camera 402 and marker 404 set on the performer's face. The output of the camera is supplied to a computer (to be described later) that receives the video data to generate marker displacement information. The computer utilizes a suitable program that processes the video data frame by frame. For each frame, the program identifies the position of the markers. By analyzing the position of the markers from one frame to another, the marker displacement can be obtained. Alternatively, the marker displacement can be stored on a computer readable storage medium and be processed by the animation system. This is useful when the animation sequence does not need to be created in real time. Optionally, these live tracing systems also include a microphone 406 or headset allowing the system to synchronize the voice of the performance actor immediately with the animated sequence. For more detailed information about live tracking systems, the reader is invited to consult L. Williams, "Performance driven facial animation," Computer Graphics (SIGGRAPH '90 Proceedings), volume 24, Aug. 1990, pp. 325–242 whose content is hereby incorporated by reference. Alternatively to obtaining displacement values from a live performer, displacement values may be supplied by a program or by some other means such as interactively moving a set of markers on a computer screen. Methods other than the ones presented here do not detract from the spirit of the invention provided that a set of values can be obtained and used as displacement values. Therefore, in the case where displacement values are submitted, the registration stage may be omitted from the process.

Figure 3:
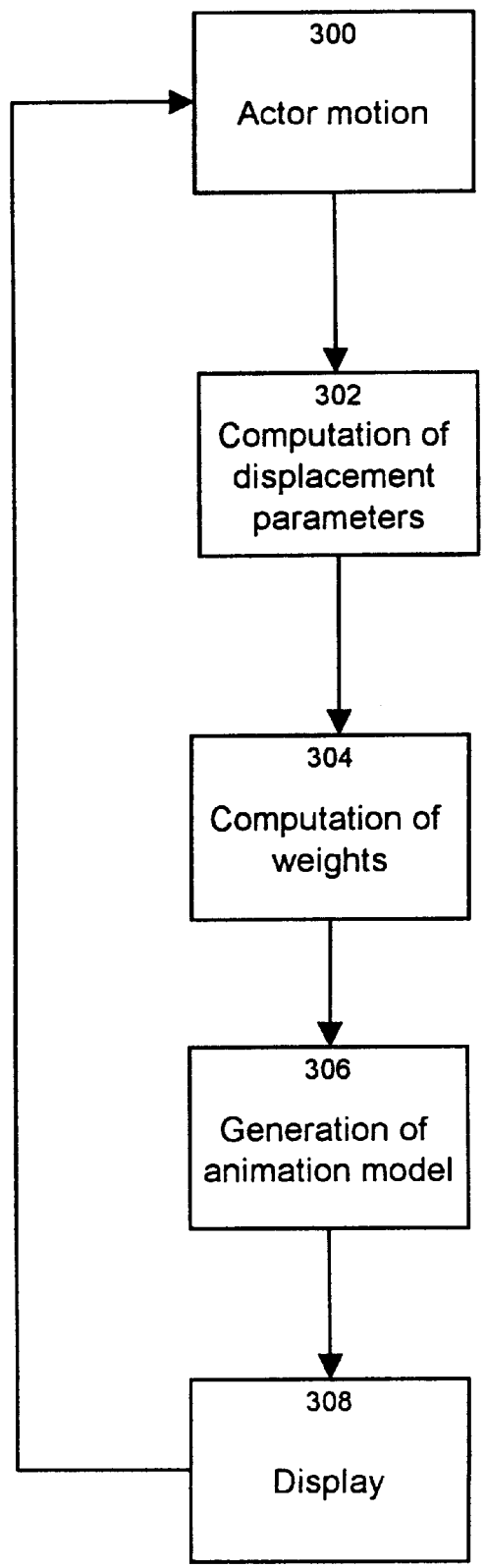
FIG. 3 shows the steps in the process for animating a synthetic part in accordance with the invention.

Following the registration stage 102, the animation stage 104 produces the animation sequence. An animated sequence can be obtained by constructing one facial expression for each time frame and interpolating the result for the time in between frames. The animation stage 104 is shown in more detail in FIG. 3 and can be divided into five stages namely actor motion 300; computation of displacement parameters 302; computation of weights 304; generation of animation model 306 and display 308. In the preferred embodiment, each facial expression is constructing by obtaining a linear combination of basic facial expressions that best follows the displacements of the physical markers on the performer's face. However, combining the n basic expressions using means other than a linear combination does not detract from the spirit of the invention.

During the recording sequence, the performance actor moves his face in a desired fashion 300 in order to supply motion information to the animation system. The specific motion is left to the discretion of the performance actor. At each frame, the movements of the physical markers are collected.

Following the motion of the actor 300, step 302 involves computing the displacement of the physical markers in the synthetic coordinate space. At each frame, a displacement vector [e] is computed from a reference. The preferred embodiment uses the neutral expression $E_0$ as the reference. A mapping template is used to translate the physical displacement of the markers into displacements in the synthetic coordinate space. This mapping template takes into account the geometric scaling discrepancies between the synthetic character model and the actor's face in the case where the markers are placed on an actor's face.

The result of step 302 is a displacement vector [e] in the synthetic coordinate space. Alternatively, this displacement vector [e] may be supplied by a program or by some other means. Other methods to provide motion data to the animation system are possible such as interactively moving a set of markers or generating a set of displacement values and the use of such methods does not detract from the spirit of the invention.

Figure 6:
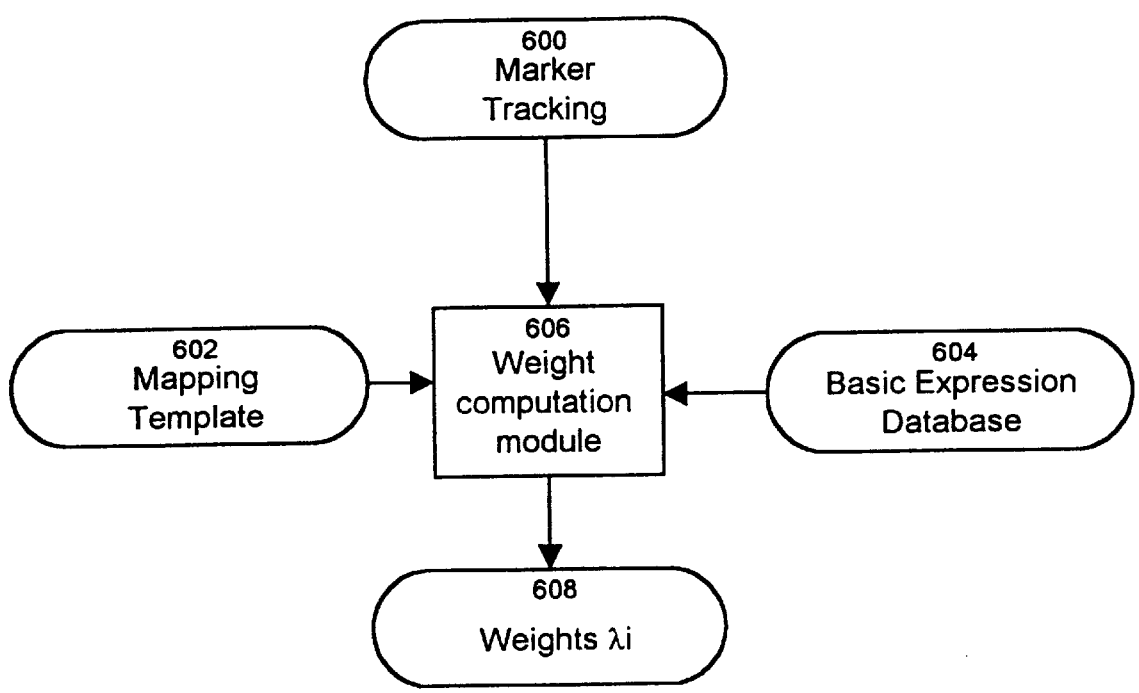
FIG. 6 shows a block diagram of the module used to compute the weights in accordance with the invention.

The following step in the generation of the animation sequence is to compute the weights $\lambda_i$ 304 that create the facial expression $E_f$. The process to compute the weights is shown in FIG. 6 of the drawings. The weight computation module 606 uses the displacement values [e] developed from marker tracking 600 as well as a mapping template 602 and the database of basic expressions 604 to generate the weights $\lambda_i$ 608. In the preferred embodiment, the database of basic expressions 604 is represented by a matrix of which each column is composed with the displacements $\xi_i$ of each point from the neutral model $E_0$ as shown in equation 2 and reproduced below in equation 4.

$$\xi_i = E_i - E_0 \qquad \text{Equation 4}$$

A vector of weights [λ] of size n where n is the number of basic expressions in the database is used to provide a linear combination of the displacements $\xi_i$ in the database to achieve the desired displacement [e]. In mathematical terms:

$$[\xi][\lambda] = [e] \qquad \text{Equation 5}$$

The movement expression e is formulated in its extended form for 3D points:

$$\begin{bmatrix} x_{\xi 1,1} & \cdots & x_{\xi n,1} \\ y_{\xi 1,1} & \cdots & y_{\xi n,1} \\ z_{\xi 1,1} & \cdots & z_{\xi n,1} \\ \vdots & \cdots & \vdots \\ x_{\xi 1,m} & \cdots & x_{\xi n,m} \\ y_{\xi 1,m} & \cdots & y_{\xi n,m} \\ z_{\xi 1,m} & \cdots & z_{\xi n,m} \end{bmatrix} \begin{bmatrix} \lambda_1 \\ \vdots \\ \lambda_n \end{bmatrix} = \begin{bmatrix} x_{e1} \\ y_{e1} \\ z_{e1} \\ \vdots \\ x_{em} \\ y_{em} \\ z_{em} \end{bmatrix} \qquad \text{Equation 6}$$

where for example $y_{\xi i,j}$ represents the Y-coordinate of the $j_{th}$ point ($1 \leq j \leq m$) in the $i_{th}$ basic facial expression and m is the number of critical points in a basic expression. Therefore in the equation above, a column represents the movements of the critical points of a single basic expression from the neutral expression and a line represents the movements of one coordinate of one critical point in all the expressions in the database.

Since the matrix [ξ] and the vector [e] are known, a solution can be found for the vector [λ] provided a solution to equation 5 exists. Alternatively, since the displacement e to achieve the desired expression $E_f$ might not be exactly representable in the space defined by the n basic expressions and the neutral expression $E_0$, we approximate [e] by [ê] according to the Euclidean norm $\|[\xi][\lambda]-[e]\|$. It is also preferable that the least square algorithm used allows constraining the values of [λ] to lie within a certain range to avoid distorting the synthetic face in an undesirable way as expressed by the following inequality:

$$\alpha_i \leq \lambda_i \leq \beta_i$$

where $\alpha_i$ and $\beta_i$ are typically in the range [0 . . . 1]. However, in situations where an exaggerated movement is desired, values of λ<0 and λ>1 can be used. Therefore, the solution for [λ] sought is one of a least square problem subject to an inequality:

$$[\xi][\lambda]=[e] \text{ and } [G][\lambda] \leq [h] \qquad \text{Equation 7}$$

where the matrices [G] and [h] jointly define the allowable range of values for the elements of [λ]. In the preferred embodiment, the matrix G is composed of n columns, where n is the number of weights being computed, and k rows where k is computed by the following equation:

$$k = \sum_{i=0}^{n} C_i \qquad \text{Equation 8}$$

$$C_i = \begin{cases} 0 & \text{if } \lambda_i \text{ has no bounding values} \\ 1 & \text{if } \lambda_i \text{ has 1 boundary value} \\ 2 & \text{if } \lambda_i \text{ has 2 bounding values} \end{cases}$$

Figure 7:
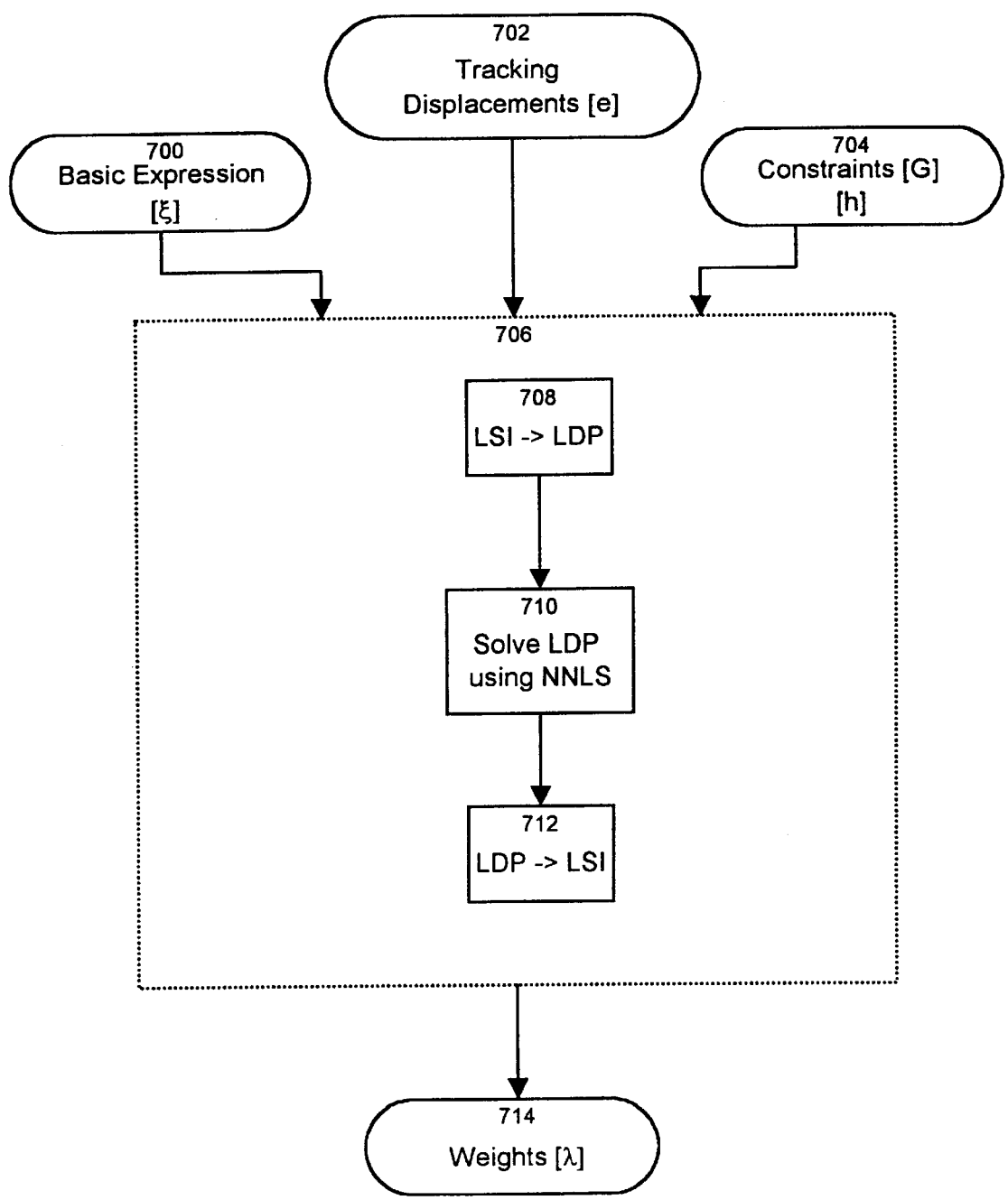
FIG. 7 shows a block diagram of the process to find a solution to the Least Square problem with Inequalities algorithm used in the preferred embodiment of this invention.

The number of lines of [h] is also equal to k. In the preferred embodiment the matrix [G] is composed of 0, 1 and −1 entries. Problems of this type are well known in the field to which this invention pertains under the name of Constrained Least Squares (CLS). The particular type of constraint shown in equation 7 is known as Least Square with inequality (LSI). The preferred embodiment of this invention uses a robust least square solver with inequalities (LSI). Algorithms to solve least square problems are well-known in the art to which this invention pertains and the user is invited to consult W. H. Press et al., Numerical Recipes in C: The Art of Scientific Computing, $2^{nd}$ ed. Cambridge University Press, 1992 whose content is hereby incorporated by reference. The preferred embodiment solution to the LSI problem is shown in FIG. 7. The CLS module 706 receives as inputs the basic expression matrix [ξ] 700, the displacement matrix [e] 702 and the constraint matrices [G] and [h] 704. The LSI problem is first transformed into a Least Distance Projection (LDP) problem 708 and the LDP is solved using the Non-Negative Least Squares (NNLS) algorithm 710. Following this, the solution to the LDP is then transformed into an LSI solution 712 and the result is returned as the weights [λ] 714. Other algorithms for solving least square problems with inequalities can be used here without detracting from the spirit of the invention. For more information about the NNLS algorithm and other Constrained Least Squares (CLS) algorithms, the reader is invited to consult C. L. Lawson and R. J. Hanson, Solving Least Square Problems, Prentice Hall, 1960 and W. H. Press et al., Numerical Recipes in C: The Art of Scientific Computing, $2^{nd}$ ed. Cambridge Press, 1992 whose contents are hereby incorporated by reference.

Following this, at step 306, the complete expression $E_f$ can be constructed for the m using the following expression:

$$\hat{e} = \sum_{i=1}^{n} \lambda_i \xi_i \qquad \text{Equations 9}$$

$$E_f = E_0 + \hat{e}$$

where ê is the approximated vector of the displacement vector [e] taking into account the boundaries of displacement of each critical point. The expression $E_f$ is then completed with all its M points by using the solution of [λ] as computed for m critical points and interpolating the result over the M points of the model. As explained above, each basic expression comprises m critical points arranged in a polygonal mesh and the complete model comprises M points where m ≤ M. This is done such as to reduce the computational load and to speed up the process of computing the weights [λ]. Interpolation over a polygonal mesh is well known in the art to which this invention pertains. The preferred embodiment of this invention uses the values of [λ] as keys for the interpolation. Alternatively, the positions of the points of the mask can be used as keys to be interpolated. Other interpolation keys may be used here without detracting from the spirit of the invention.

As a final step 308, the model with the expression $E_f$ is displayed. As previously described, an expression $E_f$ is generated for each time frame t. Hence, there will be an expression generated at times $t_0, t_1, \ldots, t_n$. Optionally, expressions may be generated only for every K frames and intermediate expressions may be created by interpolating the position of the points. The process of interpolation is well known in the art to which this invention pertains.

Figure 8:
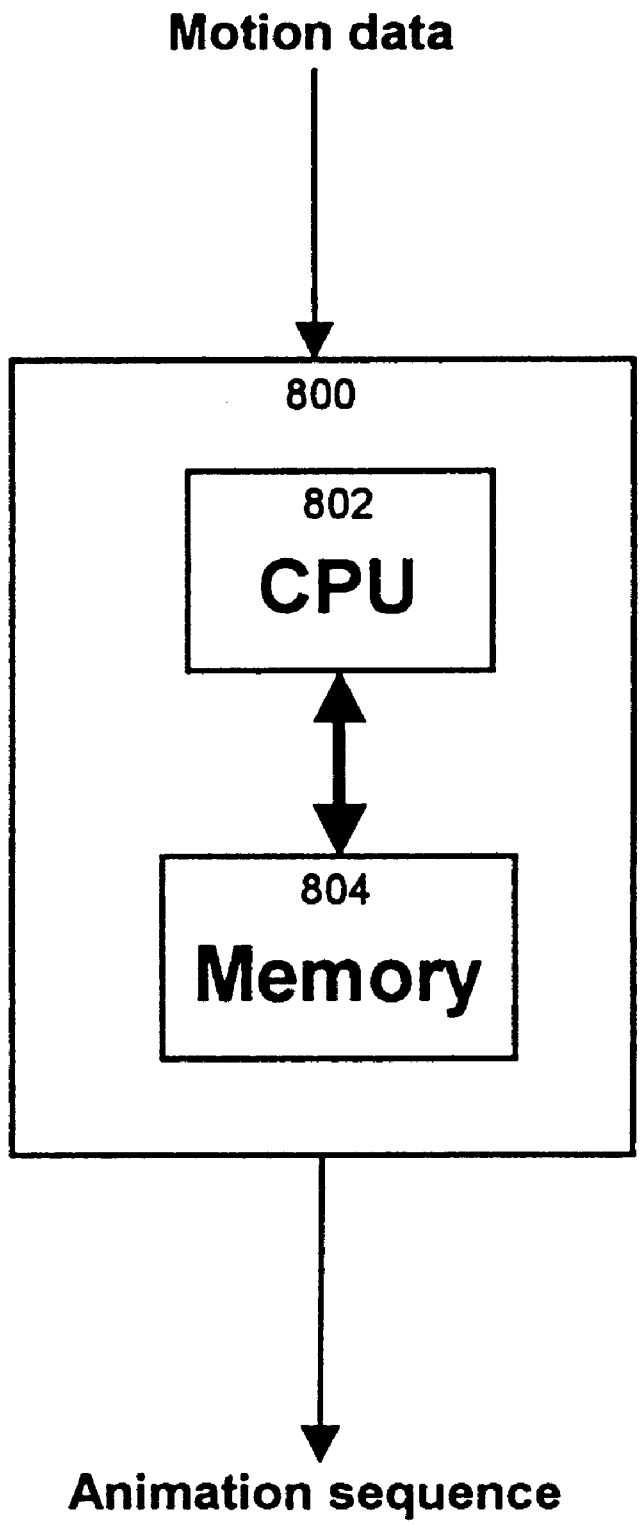
FIG. 8 is a block diagram of an apparatus embodying the principles of the present invention.

The structure of the apparatus for generating the animation sequence is depicted in FIG. 8. The apparatus 800 includes a central processing unit (CPU) 802 and a memory 804 connected by a data communication bus. The memory contains the data necessary to generate the animation sequence, namely the database of facial expressions. In addition, the memory contains a program in the form of a series of instructions that direct the CPU 802 to operate on the data in the memory 804 so as to generate the animation sequence, according to the method described earlier. In addition, the apparatus 800 includes an input that supplies the motion data necessary to generate the animation sequence. The motion data can be received in real time, directly from the video camera system illustrated in FIG. 4, or they can be read from any suitable mass storage device on which the motion data have been previously stored. In use, the motion data received at the input are loaded in the memory 804 so that they can be processed in conjunction with the database of facial expressions by the program to generate the animation sequence.

The apparatus 800 also includes an output through which is generated the animated sequence. Typically, the output produces data that can be supplied to a display, such as a screen, on which the animation sequence can be presented for view. Although not shown in the drawings, the apparatus 800 also comprises suitable interfaces allowing the input and the output to communicate with the internal components of the apparatus to allow a proper data transfer to take place.

Although the present invention has been described in considerable detail with reference to certain preferred versions thereof, other versions are possible. For example, the method and apparatus described may be used in an animation system to animate body parts other than a face such as a hand or a foot. In this type of application the database of basic postures would include a set of basic hand positions. For example, an open hand, various finger positions, a closed fist and so on. A set of critical points can be chosen to shown the position of each finger. The construction and manipulation of the movements are similar to that presented above. Therefore, the spirit and scope of the appended claims should not be limited to the description of the preferred versions contained herein.

What is claimed is:

1. A computer readable storage medium containing a program element for directing a computer to generate data providing a graphical representation of a synthetic body part in a desired posture, said program element implementing functional blocks comprising:
a first input unit for receiving source data that is representative of the synthetic body part in the desired posture;
a second input unit for receiving basic posture data from a database containing data elements, the data elements being representative of the body part in different postures; and
a processing unit for processing said source data and said basic posture data to generate the data providing a graphical representation of the synthetic body part in the desired posture.

2. A computer readable storage medium as defined in claim 1, wherein said processing unit is capable of combining a plurality of data elements with the source data to generate the data providing a graphical representation of the synthetic body part in the desired posture.

3. A computer readable storage medium as defined in claim 2, wherein said processing unit includes means for computing from said source data a displacement vector that is indicative of the displacement in a certain coordinate space of points relative to a reference to provide a representation of the synthetic body part in the desired posture, said processing unit utilizing said displacement vector for combining the plurality of data elements to generate the data providing a graphical representation of the synthetic body part in the desired posture.

4. A computer readable storage medium as defined in claim 3, wherein said processing unit computes from said displacement vector a weights vector indicative of the contribution of each data element in the database in a combination of the data elements to generate the data providing the graphical representation of the synthetic body part in the desired posture.

5. A computer readable storage medium as defined in claim 4, wherein said processing unit effects a linear combination of the data elements in the database to generate the data providing a graphical representation of the synthetic body part in the desired posture.

6. A computer readable storage medium as defined in claim 1, wherein the synthetic body part in the desired posture is a facial expression.

7. A computer readable storage medium as defined in claim 6, wherein each data element in the database provides a graphical representation of a facial expression.

8. A computer readable storage medium as defined in claim 3, wherein each data element is a collection of points in the coordinate space characterizing the body part in a certain posture.

9. A computer readable storage medium, comprising:
a program element for directing a computer to generate data providing a graphical representation of a synthetic body part in a desired posture, the computer comprising:
a memory unit for storing a database containing data elements, the data elements being representative of the body part in different postures, and a processor operatively connected to the memory unit;
said program element, when executing on the processor, being operative for:
a) receiving an input of source data that is representative of the synthetic body part in the desired posture, and
b) generating the data providing a graphical representation of the synthetic body part in the desired posture.

10. A computer readable storage medium as defined in claim 9, wherein said program element combines a plurality of data elements in dependence of the source data to generate the data providing a graphical representation of the synthetic body part in the desired posture.

11. A computer readable storage medium as defined in claim 10, wherein said program element computes from said source data a displacement vector that is indicative of the displacement in a certain coordinate space of points relative to a reference to characterize the synthetic body part in the desired posture, said processor utilizing said displacement vector for combining the plurality of data elements to generate the data providing a graphical representation of the synthetic body part in the desired posture.

12. A computer readable storage medium as defined in claim 11, wherein said program element computes in dependence of said displacement vector a weights vector indicative of the contribution of each data element in the database in a combination of the data elements to generate the data providing a graphical representation of the synthetic body part in the desired posture.

13. A computer readable storage medium as defined in claim 12, wherein said program element effects a linear combination of the data elements in the database to generate the data providing a graphical representation of the synthetic body part in the desired posture.

14. A computer readable storage medium as defined in claim 13, wherein the synthetic body part in the desired posture is a facial expression.

15. A computer readable storage medium as defined in claim 14, wherein each data element in the database characterizes a facial expression.

16. A computer readable storage medium as defined in claim 15, wherein each data element is a collection of points in the coordinate space characterizing a model of the body part in a certain posture.

17. A system for generating data providing a graphical representation synthetic body part in a desired posture, said system, comprising:
    an input for receiving source data that is representative of the synthetic body part in the desired posture;
    a memory containing a database containing data elements, the data elements being representative of the body part in different postures;
    processing means in operative relationship with said input and with said memory for processing said source data and said database to generate the data providing a graphical representation of the synthetic body part in the desired posture;
    an output for outputting the data providing a graphical representation of the synthetic body part.

18. A system as defined in claim 17, wherein said processing means is capable of combining a plurality of data elements in dependence of the source data to generate the data providing a graphical representation of the synthetic body part in the desired posture.

19. A system as defined in claim 18, wherein said processing means includes means for computing from said source data a displacement vector that is indicative of the displacement in a certain coordinate space of points relative to a reference to characterize the synthetic body part in the desired posture, said processing means utilizing said displacement vector for combining the plurality of data elements to generate the data providing a graphical representation of the synthetic body part in the desired posture.

20. A system as defined in claim 19, wherein said processing means computes in dependence of said displacement vector a weights vector indicative of the contribution of each data element in the database in a combination of the data elements to generate the data providing a graphical representation of the synthetic body part in the desired posture.

21. A system as defined in claim 20, wherein said processing means effects a linear combination of the data elements in the database to generate the data providing a graphical representation of the synthetic body part in the desired posture.

22. A system as defined in claim 21, wherein the synthetic body part in the desired posture is a facial expression.

23. A system as defined in claim 22, wherein each data element in the database characterizes a facial expression.

24. A system as defined in claim 19, wherein each data element is a collection of points in the coordinate space characterizing the body part in a certain posture.

25. A method for generating data providing a graphical representation of a synthetic body part in a desired posture, said method comprising the steps of:
    providing source data that is representative of the synthetic body part in the desired posture;
    providing a database containing data elements, the data elements being representative of the body part in different postures;
    processing the source data and data elements from said database to generate the data providing a graphical representation of the synthetic body part in the desired posture.

26. A method as defined in claim 25, wherein said processing step combines a plurality of data elements in dependence of the source data to generate the data providing a graphical representation of the synthetic body part in the desired posture.

27. A method as defined in claim 26, wherein said processing step includes the step of:
    computing from said source data a displacement vector that is indicative of the displacement in a certain coordinate space of points relative to a reference to characterize the synthetic body part in the desired posture;
    utilizing said displacement vector for combining the plurality of data elements to generate the data providing a graphical representation of the synthetic body part in the desired posture.

28. A method as defined in claim 27, wherein said processing step includes computing in dependence of said displacement vector a weights vector indicative of the contribution of each data element in the database in a combination of the data elements to generate the data providing a graphical representation of the synthetic body part in the desired posture.

29. A method as defined in claim 28, wherein said processing step includes effecting a linear combination of the data elements in the database to generate the data providing a model of the synthetic body part in the desired posture.

30. A method as defined in claim 25, wherein the synthetic body part in the desired posture is a facial expression.

31. A method as defined in claim 30, wherein each data element in the database characterizes a facial expression.

32. A method in claim 27, wherein each data element is a collection of points in the coordinate space characterizing the body part in a certain posture.

33. A computer readable storage medium containing an animation program element for directing a computer to generate a succession of data sets providing respective graphical representations of a synthetic body part in different postures, said program element implementing functional blocs comprising:
    means for receiving displacement data indicative of a desired shift of position of the synthetic body part through the different postures;
    means for receiving basic posture data from a database containing data elements, the data elements characterizing the body part in different postures;
    processing means for processing said displacement data and said basic posture data to generate the succession of data sets.

34. A computer readable storage medium as defined in claim 33, wherein said processing means is capable of combining a plurality of data elements in dependence of the displacement data to generate the succession of data sets.

35. A computer readable storage medium as defined in claim 34, wherein said processing means includes means for computing from said displacement data a displacement vector that is indicative of the displacement in a certain coordinate space of points relative to a reference, said processing means utilizing said displacement vector for combining the plurality of data elements to generate one of said data set.

36. A computer readable storage medium as defined in claim 35, wherein said processing means computes in dependence of said displacement vector a weights vector indicative of the contribution of each data element in the database in the combination of the data elements to generate said one of said data set.

37. A computer readable storage medium as defined in claim 36, wherein said processing means effects a linear combination of the data elements in the database to generate said one of said data set.

38. A computer readable storage medium as defined in claim 33, wherein the synthetic body part in the desired posture is a facial expression.

39. A computer readable storage medium as defined in claim 38, wherein each data element in the database characterizes a facial expression.

40. A computer readable storage medium as defined in claim 35, wherein each data element is a collection of points in the coordinate space characterizing the body part in a certain posture.

41. A computer readable storage medium, comprising:
  an animation program element for directing a computer to generate a succession of data sets providing respective graphical representations of a synthetic body part in different postures, the computer comprising:
    a memory unit for storing a database containing data elements, the data elements characterizing the body part in different postures;
    a processor operatively connected to the memory unit, said program element, when executing on the processor, being operative for:
      a) receiving an input of displacement data indicative of a desired shift of position of the synthetic body part through the different postures, and
      b) processing said database to generate the succession of data sets on the basis of said displacement data.

42. A computer readable storage medium as defined in claim 41, wherein said program element combines a plurality of data elements in dependence of the displacement data to generate the succession of data sets.

43. A computer readable storage medium as defined in claim 42, wherein said program element computes from said displacement data a displacement vector that is indicative of the displacement in a certain coordinate space of points relative to a reference to characterize the synthetic body part in a desired posture, said program element utilizing said displacement vector for combining the plurality of data elements to generate one of said data sets.

44. A computer readable storage medium as defined in claim 43, wherein said program element computes in dependence of said displacement vector a weights vector indicative of the contribution of each data element in the database in a combination of the data elements to generate said one data set.

45. A computer readable storage medium as defined in claim 44, wherein said program element effects a linear combination of the data elements in the database to generate said one data set.

46. A computer readable storage medium as defined in claim 45, wherein the synthetic body part in the desired posture is a facial expression.

47. A computer readable storage medium as defined in claim 46, wherein each data element in the database characterizes a facial expression.

48. A computer readable storage medium as defined in claim 47, wherein each data element is a collection of points in the coordinate space characterizing the body part in a certain posture.

49. An animation system for generating a succession of data sets providing respective graphical representations of a synthetic body part in different postures, said system comprising:
  an input for receiving displacement data indicative of a desired shift of position of the synthetic body part through the different postures;
  a memory containing a database containing data elements, the data elements characterizing the body part in different postures;
  processing means in operative relationship with said input and with said memory for processing said displacement data and said data elements to generate the succession of data sets;
  an output for outputting the data sets.

50. A system as defined in claim 49, wherein said processing means is capable of combining a plurality of data elements in dependence of the displacement data to generate the succession of data sets.

51. A system as defined in claim 50, wherein said processing means includes means for computing from said displacement data a displacement vector that is indicative of the displacement in a certain coordinate space of points relative to a reference to characterize the synthetic body part in the desired posture, said processing means utilizing said displacement vector for combining the plurality of data elements to generate one data set in the succession of data sets.

52. A system as defined in claim 51, wherein said processing means computes in dependence of said displacement vector a weights vector indicative of the contribution of each data element in the database in a combination of the data elements to generate said one data set.

53. A system as defined in claim 52, wherein said processing means effects a linear combination of the data elements in the database to generate said one data set.

54. A system as defined in claim 53, wherein the synthetic body part in the desired posture is a facial expression.

55. A system as defined in claim 54, wherein each data element in the database characterizes a facial expression.

56. A system as defined in claim 51, wherein each data element is a collection of points in the coordinate space characterizing the body part in a certain posture.

57. A method for animating a synthetic body part by generating a succession of data sets providing respective graphical representations of the synthetic body part in different postures, said method comprising the steps of:
  providing source data indicative of a desired shift of position of the synthetic body part through the different postures;
  providing a database containing data elements, the data element being representative of the body part in different postures;
  processing means for processing said displacement data and said database to generate the succession of data sets.

58. A method as defined in claim 57, wherein said processing step combines a plurality of data elements in dependence of the source data to generate the succession of data sets.

59. A method as defined in claim 58, wherein said processing step includes the step of:
   computing from said displacement data a displacement vector that is indicative of the displacement in a certain coordinate space of points relative to a reference to characterize of the synthetic body part in the desired posture;
   utilizing said displacement vector for combining the plurality of data elements to generate one data set in said succession of data sets.

60. A method as defined in claim 59, wherein said processing step includes computing in dependence of said displacement vector a weights vector indicative of the contribution of each data element in the database in a combination of the data elements to generate said one data set.

61. A method as defined in claim 60, wherein said processing step includes effecting a linear combination of the data elements in the database to generate said one data set.

62. A method as defined in claim 57, wherein the synthetic body part in the desired posture is a facial expression.

63. A method as defined in claim 62, wherein each data element in the database characterizes a facial expression.

64. A method in claim 59, wherein each data element is a collection of points in the coordinate space characterizing the body part in a certain posture.

* * * * *